(12) United States Patent
Supina et al.

(10) Patent No.: US 6,553,287 B1
(45) Date of Patent: Apr. 22, 2003

(54) HYBRID ELECTRIC VEHICLE CONTROL STRATEGY TO ACHIEVE MAXIMUM WIDE OPEN THROTTLE ACCELERATION PERFORMANCE

(75) Inventors: Joseph Gerald Supina, Belleville, MI (US); Ming Lang Kuang, Canton, MI (US); Vincent Freyermuth, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,793

(22) Filed: Oct. 19, 2001

(51) Int. Cl.$^7$ .............................. G06F 7/00; B60L 11/18
(52) U.S. Cl. ........................ 701/22; 477/3; 180/65.2; 180/65.3; 180/69.6; 318/139
(58) Field of Search ................. 701/22, 1, 62, 701/64, 55; 477/169, 110, 3, 143, 155; 290/45, 40 C; 180/65.2, 165, 65.3, 197, 69.6; 318/9, 139; 475/1, 10, 211; 192/220.4; 74/334, 337.5, 473.11

(56) References Cited

U.S. PATENT DOCUMENTS

| | | | |
|---|---|---|---|
| 4,351,405 A | 9/1982 | Fields et al. | |
| 4,438,342 A | 3/1984 | Kenyon | |
| 5,343,970 A | 9/1994 | Severinsky | |
| 5,427,194 A | 6/1995 | Miller | |
| 5,755,303 A | 5/1998 | Yamamoto et al. | |
| 5,775,449 A | 7/1998 | Moroto et al. | |
| 5,915,488 A | 6/1999 | Fliege | |
| 6,054,844 A | 4/2000 | Frank | |
| 6,116,363 A | 9/2000 | Frank | |
| 6,233,508 B1 | 5/2001 | Deguchi et al. | |
| 6,295,487 B1 * | 9/2001 | Ono et al. | 180/165 |
| 6,307,277 B1 * | 10/2001 | Tamai et al. | 180/65.2 |
| 6,336,063 B1 * | 1/2002 | Lennevi | 180/65.1 |
| 2001/0020554 A1 * | 9/2001 | Yanase et al. | 180/65.3 |
| 2001/0032046 A1 * | 10/2001 | Nada | 701/82 |
| 2001/0039230 A1 * | 11/2001 | Severinsky et al. | 477/3 |

* cited by examiner

Primary Examiner—Thomas G. Black
Assistant Examiner—Ronnie Mancho
(74) Attorney, Agent, or Firm—Brooks & Kushman; Carlos L. Hanze

(57) ABSTRACT

The invention is a controller for a hybrid electric vehicle (HEV) to meet driver expectation when forward wide open throttle (WOT) acceleration is requested while optimizing the total powertrain system efficiency and performance, especially when the engine is not even running. The controller can consider accelerator position, PRNDL position, and vehicle speed and start the engine if an estimated sum torque of a traction motor and generator motor is less than the calculated sum torque output of the traction motor and the engine at any given speed. Other control variables can include battery condition such as operating capacity, temperature, and state of charge. A constant can be added to allow a prestart of the engine to assure it is available when needed to maintain vehicle WOT acceleration requests.

10 Claims, 3 Drawing Sheets

HYBRID ELECTRIC VEHICLE CONTROL STRATEGY TO ACHIEVE MAXIMUM WIDE OPEN THROTTLE ACCELERATION PERFORMANCE

BACKGROUND OF INVENTION

The present invention relates generally to a hybrid electric vehicle (HEV), and specifically to a strategy to control a split powertrain HEV to achieve maximum wide open throttle (WOT) acceleration performance.

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where a driver is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another electric motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a powersplit configuration. In one of several types of PSHEV configurations, the ICE is mechanically coupled to two electric motors in a planetary gear-set transaxle. A first electric motor, the generator, is connected to a sun gear. The ICE is connected to a carrier gear. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or drivability. The HEV allows the use of smaller engines, regenerative braking, electric boost, and even operating the vehicle with the engine shutdown. Nevertheless, new ways must be developed to optimize the HEV's potential benefits.

One such area of HEV development is controlling a powersplit HEV to achieve wide open throttle (WOT) acceleration performance at various speeds especially when an engine is not running. Any successful HEV implementation should consider that drivability and performance of the vehicle should at least be comparable to a conventional ICE powered vehicle.

HEV controllers are known in the prior art. Severinsky describes a simplistic HEV control unit to determine acceleration based on accelerator position and a processor to use the motor up to about 25 mph then in combination with the ICE for high-speed acceleration. U.S. Pat. No. 5,755,303 to Yamamoto et al. describes continuously variable transmissions that allow each powertrain source to operate efficiently. U.S. Pat. No. 5,775,449 to Moroto et al. during hi-torque requirements suspends generator functions and increases engine torque by reducing clutch slippage. U.S. Pat. No. 5,915,488 to Fliege describes a safety mechanism to reduce power to an electric motor if damaging amounts of acceleration are detected. U.S. Pat. No. 6,054,844 to Frank discloses an overall HEV control system for an ICE using a continuously variable transmission engine to operate at "wide open throttle" (WOT), or along the "Ideal Torque/Speed Operating Line" (IOL) for best efficiency and lowest emissions. U.S. Pat. No. 6,11 6,363 to Frank describes a system that when operating in the HEV mode, the ICE operates at high throttle settings and, when the ICE is operating at wide open throttle (WOT) but additional power is still required, the driver depresses the pedal further and electric motor torque is automatically added. Therefore, vehicle acceleration is proportional to the accelerator pedal position as in a conventional car.

Unfortunately, no precise strategy is known to control a split powertrain HEV that attempts to coordinate the HEV's power sources (traction motor, generator motor, engine) to satisfy driver demand and expectation for wide open throttle (WOT) acceleration performance while optimizing the total powertrain system efficiency and performance such as when an engine is not even operating. Further precision to include battery conditions such as output capacity, temperature, and state of charge are also needed.

SUMMARY OF INVENTION

Accordingly, the present invention provides a strategy to control a split powertrain hybrid electric vehicle (HEV) to coordinate the HEV's power sources to satisfy driver demand and expectation for wide open throttle (WOT) acceleration performance at any speed while optimizing the total powertrain system efficiency and performance, especially when the engine is not even running.

Specifically, the invention provides a control system for an HEV powertrain powered by at least one of an engine, a traction motor, and a generator motor comprising sensors for accelerator position, vehicle speed, and gear selector (PRNDL) position. The HEV has a battery for powering the traction motor and generator motor and receiving power from the generator motor. The control of the present invention can receive input from the accelerator position sensor, vehicle speed sensor, and PRNDL position sensor; make a determination of whether full forward acceleration is requested (D or L); making a determination of whether the engine is running; estimate the sum torque of the traction motor and the generator motor if the engine is not running, calculating the maximum sum torque output of the traction motor and the engine, comparing the estimated sum torque of the traction motor and the generator motor with the calculated sum torque output of the traction motor and the engine, and starting the engine if the estimated sum torque of the traction motor and the generator motor is less than the calculated sum torque output of the traction motor and the engine for a given vehicle speed.

In one embodiment of the present invention, battery sensors connected to the battery and VSC can be added for battery operating capacity, temperature and state of charge. These sensors can add even more precision to the estimating of the sum torque of the traction motor and the generator motor and the calculating of the maximum sum torque output of the traction motor and the engine.

In another embodiment of the present invention, the control system can use a constant to allow a prestart of the engine when estimating the sum torque of the traction motor and the generator motor and the calculating of the maximum sum torque output of the traction motor and the engine.

Other objects of the present invention will become more apparent to persons having ordinary skill in the art to which the present invention pertains from the following description taken in conjunction with the accompanying FIGS.

BRIEF DESCRIPTION OF DRAWINGS

The foregoing objects, advantages, and features, as well as other objects and advantages, will become apparent with reference to the description and FIGS. below, in which like numerals represent like elements and in which.

DETAILED DESCRIPTION

Figure 1:
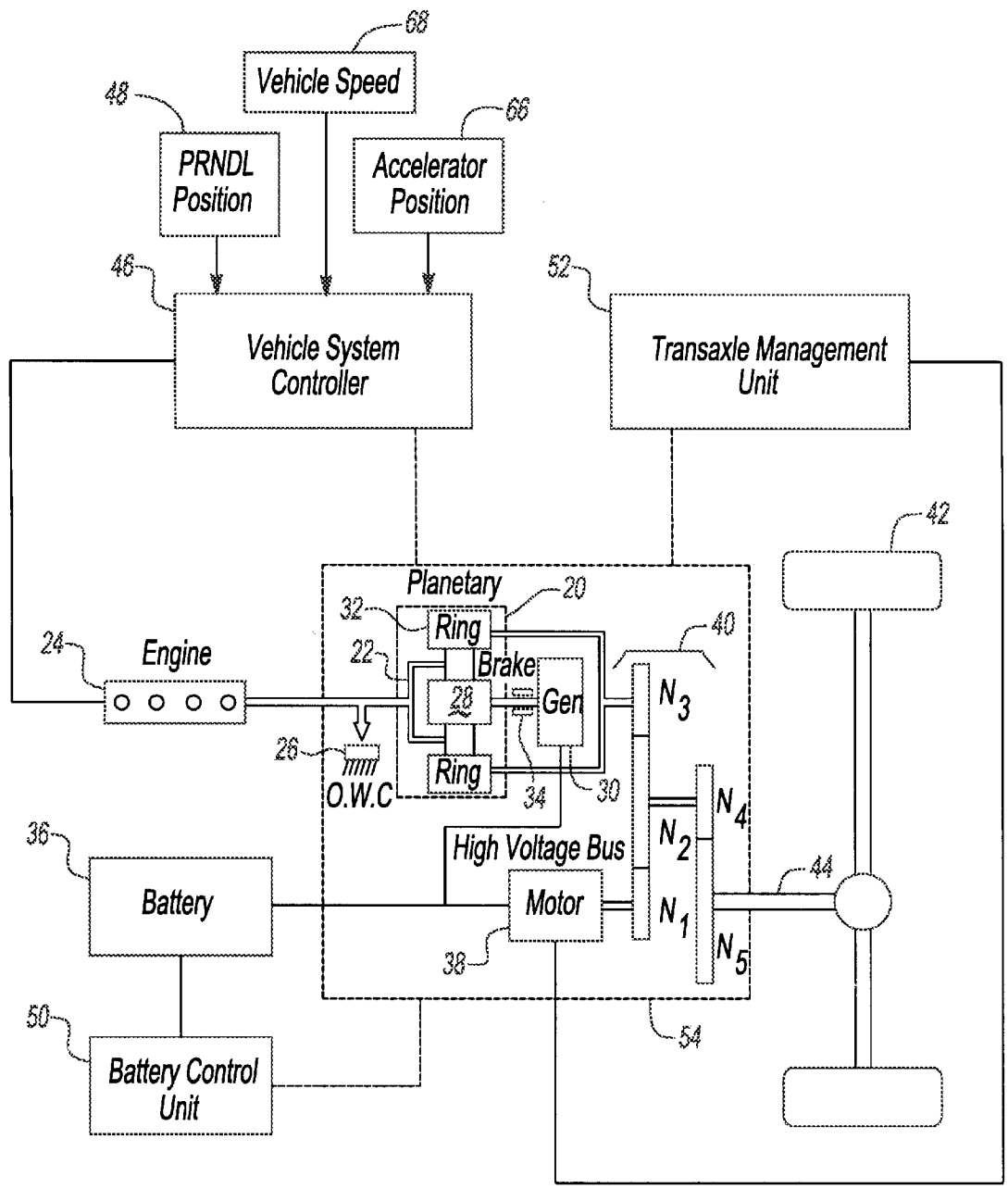
FIG. 1 illustrates a general hybrid electric vehicle (HEV) configuration.

The present invention relates to electric vehicles and, more particularly, to hybrid electric vehicles (HEVs). FIG. 1 demonstrates just one possible configuration, specifically a parallel/series hybrid electric vehicle (powersplit) configuration.

In a basic HEV, a planetary gear set 20 mechanically couples a carrier gear 22 to an engine 24 with a one-way clutch 26 to prevent the engine 24 from rotating in a counter clockwise (CCW) direction. The planetary gear set 20 also mechanically couples a sun gear 28 to a generator motor 30 and a ring (output) gear 32. The generator motor 30 also mechanically links to a generator brake 34 and is electrically linked to a device to store electrical energy and output energy to motor (battery) 36 to receive electric energy converted from mechanical energy by the generator motor 30. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44. The mechanical coupling represents collectively a power transmission device, the power transmission device being connected to the engine 24, the traction motor 38 and the generator motor 30. This power transmission device can be configured to have at least one forward drive position to move the HEV in a forward direction and at least one reverse drive position to move the HEV in a reverse direction. A driver operated drive position selector (gear selector) (not shown) determines whether the vehicle is to move in the forward, neutral or reverse direction.

The planetary gear set 20 splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. The VSC 46 can also receive and monitor various vehicle inputs such as a gear selector (PRNDL) position sensor 48, an accelerator position sensor 66, and a vehicle speed sensor 68. An engine control unit (ECU) (not shown) can connect to the engine 24 via a hardwire interface. The ECU and VSC 46 can be based in the same unit, but are actually separate controllers. The VSC 46 communicates with the ECU, as well as a battery control unit (BCU) 50 and a transaxle management unit (TMU) 52 through a communication network such as a controller area network (CAN) 54. The BCU 50 connects to the battery 36 via a hardwire interface. The BCU 50 can monitor and communicate battery output capacity, temperature and state of charge (SOC) to the VSC 46. The TMU 52 controls the generator motor 30 and traction motor 38 via a hardwire interface.

Figure 2:
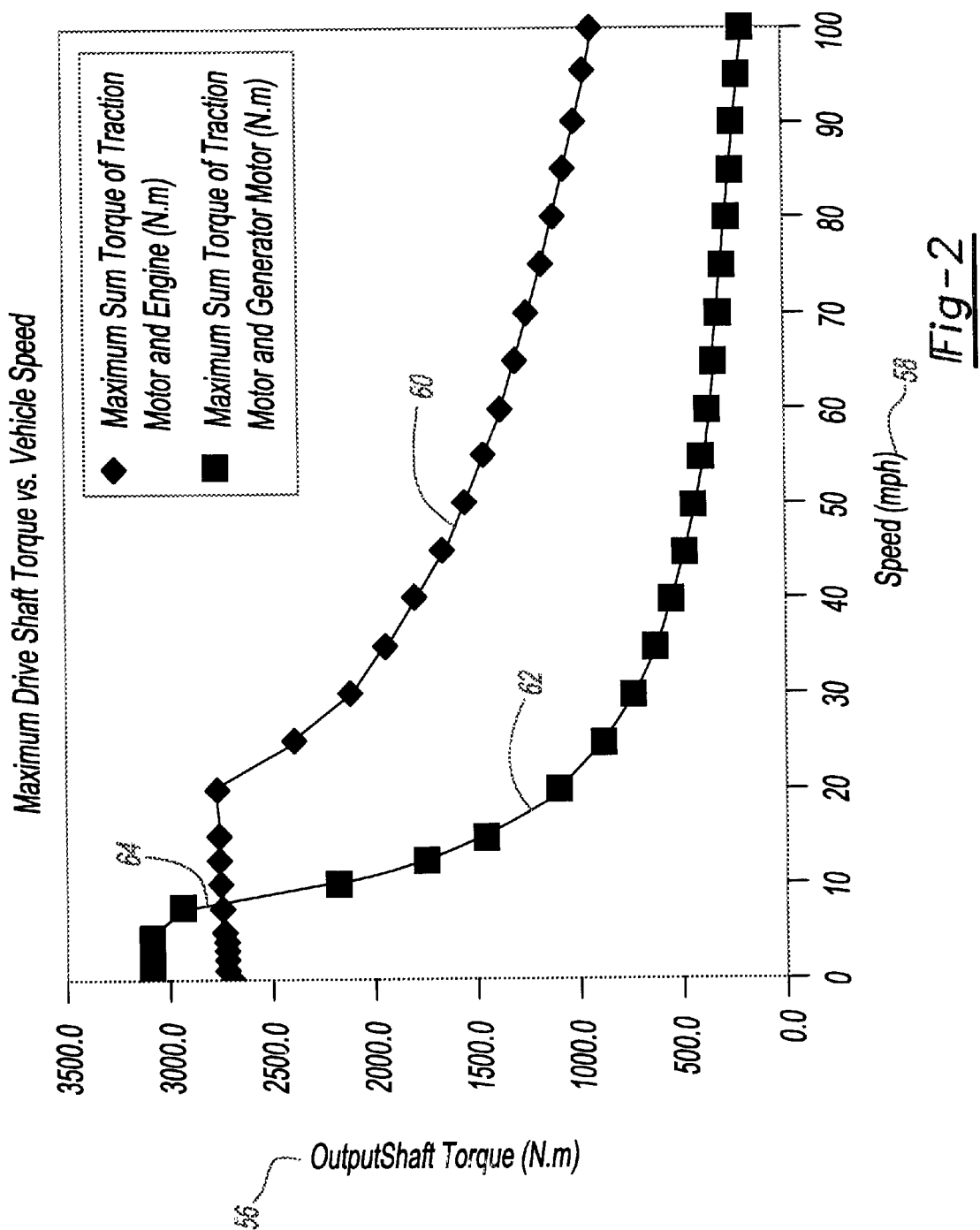
FIG. 2 illustrates a graphic comparison of maximum output shaft torques and vehicle speed.

FIG. 2 illustrates a maximum possible output shaft torque 56 compared against vehicle speed 58 in miles per hour for: (1) a maximum sum torque of the traction motor and engine curve 60 and (2) a maximum sum torque of the traction motor and generator motor curve 62. The VSC 46 controls and coordinates these power sources to satisfy the driver's demand while optimizing the total powertrain system efficiency and performance. When the driver demands full vehicle acceleration, comparable to a wide open throttle (WOT) known for conventional ICE vehicles, the VSC 46 will first request the traction motor 38 and generator motor 30 to deliver maximum torque capability since they have a higher torque capability at low vehicle speed, and can generate almost instantaneous torque as is shown in FIG. 2.

The torque curves illustrated in FIG. 2 can vary based on battery 36 factors. For example, the maximum sum torques 60 and 62 supplied in response to the driver's WOT acceleration demand may be less than illustrated if the battery does not have the capacity to provide the energy needed to power the motors to meet the torque demand. Other factors that can reduce sum torques can include battery 36 temperature and battery 36 state of charge (SOC).

At some point vehicle speed 58, as illustrated in FIG. 2, the maximum sum torque of the traction motor and generator motor 62 falls below the maximum sum torque of the traction motor and engine 60. This cross over point 64 occurs in the example provided in FIG. 2 at about ten miles per hour. Any successful HEV strategy for WOT conditions must anticipate that the engine 24 needs to be started before the vehicle reaches the crossover point 64. Again, this cross over point 64 can vary (e.g., decrease) based on battery factors such as output capacity, SOC, and temperature.

Accordingly, the present invention can include a strategy for the VSC 46 to maintain the highest output shaft torque 56 possible during a WOT request from the vehicle driver at any speed. The strategy calculates output shaft torque curves for the traction motor 38 and generator motor 30 combination and the traction motor 38 and generator motor 30 combination at various vehicle speeds. The strategy will also calculate a cross over point between the two output shaft torque curves. Calculations will consider battery 36 output capacity, temperature, and SOC. The strategy commands the vehicle powertrain to follow the highest output shaft 44 curve based on vehicle speed and assure the engine 24 is started in time to allow a smooth transition from traction motor 38 and generator motor 30 configuration to a traction motor 38 and engine 24 configuration.

Generally, the strategy determines when to start the engine 24 to achieve maximum vehicle acceleration performance under various battery 36 conditions. The engine 24 can be commanded to start when the driver demands full accelerator pedal acceleration and the motor and generator sum torque at the drive shaft is less than the sum torque of the motor and engine at the drive shaft. The basic steps can include steps to 1) read all the necessary inputs, 2) determine if the driver is requesting WOT acceleration and forward motion, 3) estimate the sum torque of the traction motor 38 and generator motor 30 at the drive shaft, and the maximum sum torque of the traction motor and engine 60 at the output shaft 44, 4) compare the two sum torques, and 5) start the engine if the sum torque of the motor and generator is less than the maximum sum torque of motor and engine 60.

Figure 3:
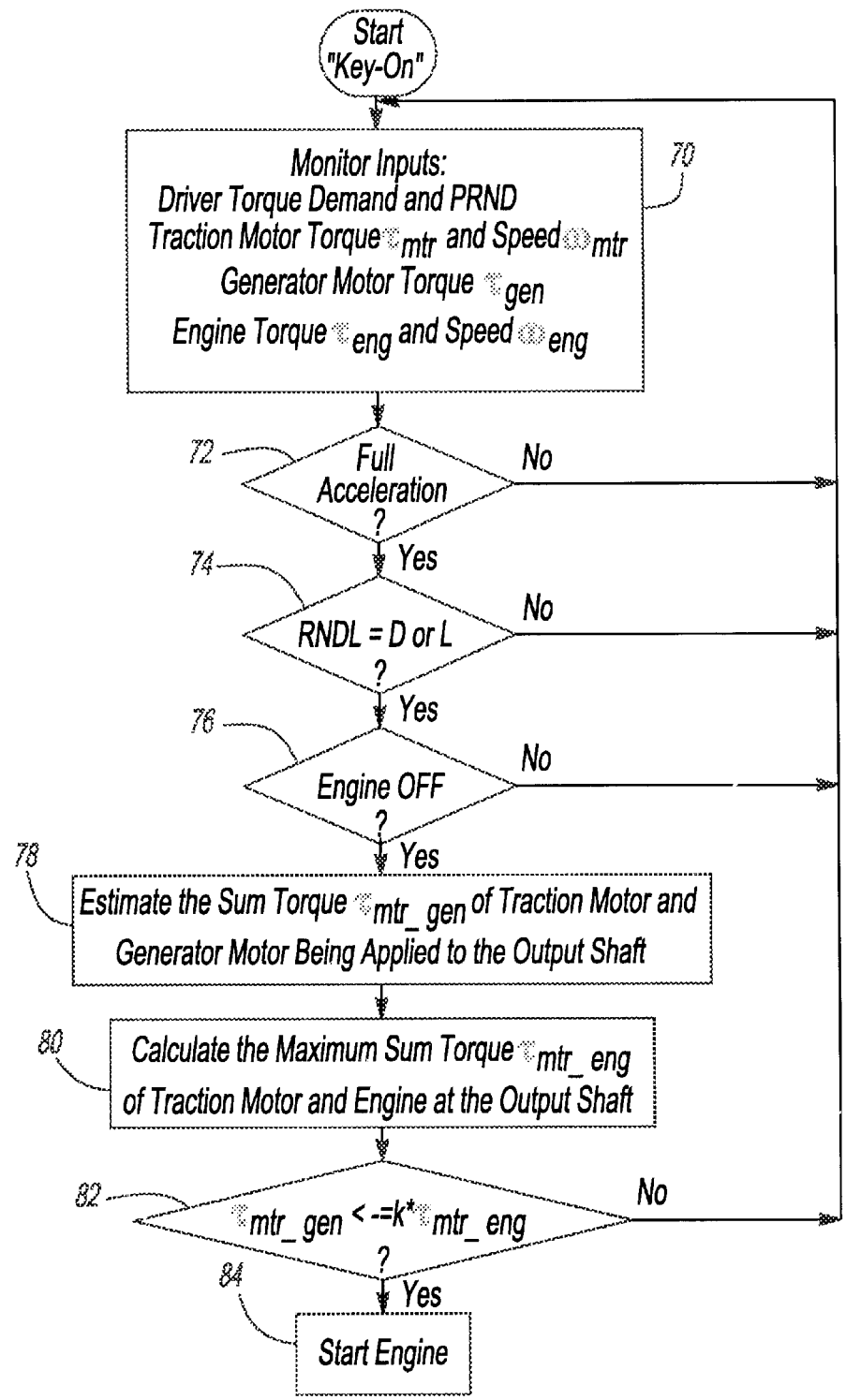
FIG. 3 illustrates a potential strategy of the present invention.

One possible strategy of the present invention within the VSC 46 is illustrated in FIG. 3. The strategy begins with each key-on event and ends at each key-off event. First, the strategy at step 70 monitors input from the PRNDL position sensor 48 and the accelerator position sensor 66. The strategy at step 70 can also monitor torque and speed of the traction motor 38, generator motor 30, and engine 24. The strategy can even be configured to monitor battery 36 output capacity, state of charge and temperature from the BCU 50.

The strategy must first determine whether the driver intends WOT acceleration. At step 72, the strategy determines whether the accelerator is in its fully open position. If no, the strategy returns to step 70. If the accelerator is determined to be in its fully open position at step 72, the strategy proceeds to step 74. At step 74, the strategy determines whether the PRNDL is in a forward drive mode such as D (forward drive) or L (low forward drive) position. If no, the strategy returns to step 70. If yes, the strategy has established a WOT acceleration condition exists.

Once the strategy has determined in steps 72 and 74 that a WOT acceleration condition exists, the strategy proceeds to step 76 and determines whether the engine 24 is currently operating/running. This can be done in any number of ways known in the art. If the engine is running at step 76, the strategy returns to step 70 since there is no need to proceed to determine whether to start the engine 24. If at step 76, it is determined that the engine 24 is not running, the strategy needs to determine whether the engine 24 needs to be started.

To determine whether to start the engine 24, the strategy takes the monitoring inputs obtained in step 70 to estimate the sum torque of the traction motor and generator motor 62, and the sum torque of the traction motor and engine 60. This begins at step 78 with an estimation of the sum torque of traction motor and generator motor at the output shaft 44. The sum torque, as described above, can vary depending upon the battery 36 conditions (battery 36 capacity, SOC, and temperature) with the same full acceleration demand and vehicle speed. For purposes of demonstration, an estimation of the traction motor and generator motor sum torque at the output shaft can be calculated as follows:

$$\tau_{mtr\_gen} = \frac{T_g}{T_2}\left(\tau_{mtr} - T_1 \times T_2 \times \frac{1}{\rho}\tau_{gen} + J_{gen\_couple} \times \frac{d\omega_{eng}}{dt} - J_{mtr\_eff} \times \frac{d\omega_{mtr}}{dt}\right)$$

Where:
$\omega_{eng}$—engine speed (rad/s)
$\omega_{mtr}$—traction motor speed (rad/s)
$\tau_{mtr}$—traction motor torque (NM)
$\tau_{gen}$—generator motor torque (NM)
$\tau_{mtr\_gen}$—sum torque of the motor and generator at the drive shaft (NM)
$\tau_{mtr\_eng}$—sum torque of the motor and engine at the drive shaft (NM)
(Note: all the inertia units are $Kg*M^2$)
$J_{gen\_couple}=(T_{eng2gen}*T_1*T_2)/\rho*J_{gen\&sun}$
$J_{mtr\_eff}=J_{mtrlumped}+(T_1*T_2/\rho)^2*J_{gen\&sun}$,
$J_{eng\&carrier}$—lumped moment inertia of engine and carrier gear,
$J_{gen\&sun}$—lumped moment inertia of generator rotor and sun gear,
$J_{mtr\_lumped}$—lumped moment inertia of motor rotor, ring gear, and gear N1, N3, N2, N4, N5,
$J_{mtr\_lumped}=J_{mtr\&N1}+T^2_{mtr2ring}*J_{ring\&N3}+T^2_2*J_{N2\&N4}+(T_2/T_g)^2*J_{N5}$
$T_1$=N2/N3—gear ratio from counter shaft to ring gear shaft
$T_2$=N1/N2—gear ratio from traction motor shaft to counter shaft
Tg=N5/N4—gear ratio from drive shaft to counter shaft
$\rho$=Ns/Nr—planetary gear ratio
$T_{mtr2ring}$=N1/N3—gear ratio from motor to ring gear
$T_{eng2gen}$=(1+1/$\rho$)—gear ratio from engine to generator
After the sum torque of the traction motor 38 and the generator motor 30

($\tau_{mtr\_gen}$)
is estimated in step 78, the strategy proceeds to step 80 and calculates the maximum sum torque of traction motor and engine 60

($\tau_{mtr\_eng}$)
This step calculates the maximum sum torque of the traction motor and engine 60 or given vehicle speed. Again, the present invention can be configured to utilize battery 36 conditions in its estimation.

Once the maximum sum torque of traction motor and engine 60 is calculated in step 80, the strategy proceeds to step 82 and compares the traction motor and generator motor sum torque with the maximum traction motor and engine sum torque 62 in step 82. As illustrated in FIG. 3, if τmtr_gen<=k*τmtr_eng,
an engine 24 start command is required (i.e., the sum torque of the traction motor 38 and generator motor 30 is less than or equal to the sum torque of the traction motor 38 and engine 24). The variable k in the comparison equation ensures that the engine 24 is started as the two curves cross over shown in FIG. 2. This k can be a constant or a function of battery 36 conditions as described above. Further, the constant can even be used to alter the calculation of the maximum sum torque of the traction motor and the generator 62 to allow an earlier start (a prestart) of the engine 24 to assure a smooth transition between powertrain configurations from traction motor 38 and generator motor 30 to the traction motor 38 and engine 24.

Therefore, in step 82 if the sum torque of the traction motor 38 and generator motor 30 (in step 78) is determined to be less than the maximum sum torque of the motor and engine 60 (calculated in step 80), the strategy proceeds to step 84 and commands the engine 24 to be started. This achieves maximum system acceleration performance for given battery 36 conditions. If τmtr_gen is not<=k*τmtr_eng in step 82, the strategy returns to step 70.

The above-described embodiment of the invention is provided purely for purposes of example. Many other variations, modifications, and applications of the invention may be made.

We claim:

1. A control system for a powersplit hybrid electric vehicle PSHEV powertrain powered by at least one of an engine, a traction motor, and a generator motor comprising:
    an accelerator position sensor;
    a vehicle speed sensor;
    a PRNDL position sensor;
    a battery for powering the traction motor and generator motor and receiving power from the generator motor; and
    a vehicle system control (VSC) to control the vehicle powertrain, the VSC
        receiving input from the accelerator position sensor, vehicle speed sensor, and PRNDL position sensor
        making a determination of whether full forward acceleration is requested,
        making a determination of whether the engine is running, estimating the sum torque of the traction motor and the generator motor if the engine is not running,
        calculating the maximum sum torque output of the traction motor and the engine,
        comparing the estimated sum torque of the traction motor and the generator motor with the calculated sum torque output of the traction motor and the engine, and
        starting the engine if the estimated sum torque of the traction motor and the generator motor is less than the calculated sum torque output of the traction motor and the engine for a given vehicle speed.

2. The control system of claim 1 further comprising battery sensors connected to the battery and VSC.

3. The control system of claim 2, wherein the battery sensors sense battery operating capacity, temperature and state of charge.

4. The control system of claim 2 wherein the estimating of the sum torque of the traction motor and the generator motor and the calculating of the maximum sum torque output of the traction motor and the engine use input from the battery sensors.

5. The control system of claim 2 wherein the estimating of the sum torque of the traction motor and the generator motor and the calculating of the maximum sum torque output of the traction motor and the engine use a constant to allow a prestart of the engine.

6. A method to control a powersplit hybrid electric vehicle PSHEV powertrain by at least one of an engine, a traction motor, and a generator motor comprising:
    sensing accelerator position;
    sensing vehicle speed;
    sensing PRNDL position;
    receiving, storing and providing power to the traction motor and generator motor; and
    controlling the vehicle powertrain using a vehicle system control (VSC), including
        receiving input from the accelerator position sensor, vehicle speed sensor, and PRNDL position sensor
        making a determination of whether full forward acceleration is requested,
        making a determination of whether the engine is running, estimating the sum torque of the traction motor and the generator motor if the engine is not running,
        calculating the maximum sum torque output of the traction motor and the engine,
        comparing the estimated sum torque of the traction motor and the generator motor with the calculated sum torque output of the traction
        motor and the engine, and
        starting the engine if the estimated sum torque of the traction motor and the generator motor is less than the calculated sum torque output of the traction motor and the engine for a given vehicle speed.

7. The method of claim 6 further comprising the step of sensing battery condition with the VSC.

8. The method of claim 7, wherein the battery sensing step senses battery operating capacity, temperature and state of charge.

9. The method of claim 7 wherein the step of estimating the sum torque of the traction motor and the generator motor and the calculating of the maximum sum torque output of the traction motor and the engine includes using battery sensing.

10. The method of claim 7 wherein the step of estimating the sum torque of the traction motor and the generator motor and the calculating of the maximum sum torque output of the traction motor and the engine includes using a constant to allow a prestart of the engine.

* * * * *